Dec. 21, 1926.

W. R. MARKWICK

VARIABLE SPEED CLUTCH

Filed July 10, 1924

1,611,761

INVENTOR
WALTER. R. MARKWICK
BY
ATTORNEYS.

Patented Dec. 21, 1926.

1,611,761

UNITED STATES PATENT OFFICE.

WALTER ROBERT MARKWICK, OF TORONTO, ONTARIO, CANADA.

VARIABLE-SPEED CLUTCH.

Application filed July 10, 1924. Serial No. 725,188.

My invention relates to improvements in variable speed clutches, and the object of the invention is to devise a clutch of this type which will have great flexibility of speed control, which will be silent and positive in action, in which there will be no chattering of the shoes when the clutch is released, and in which vibration will be reduced to a minimum providing a perfect balance of parts, and it consists essentially of the arrangement and construction of parts hereinafter more particularly described by the following specification.

In the drawings like characters of reference indicate corresponding parts in each figure.

Figure 1:
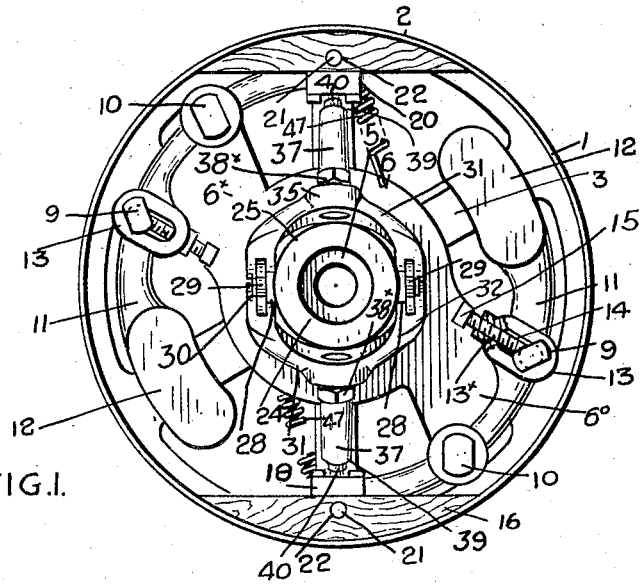
Fig. 1 is a front elevation of a pulley and my clutch device applied thereto.
Figures 2, 3:
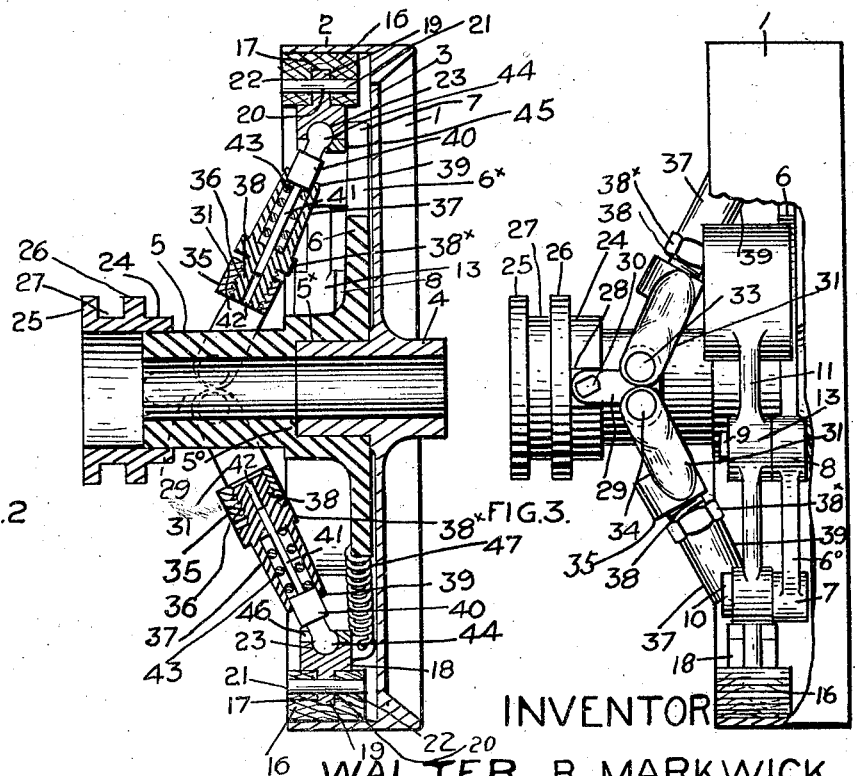
Fig. 2 is a vertical section through Fig. 1.
Fig. 3 is an edge elevation showing a portion of the pulley rim broken away to exhibit the construction of my clutch.

1 indicates a pulley provided with a rim 2, spokes 3 and hub 4.

5 is a sleeve, the inner end of the central orifice of which is enlarged, as indicated at $5^x$ forming an annular shoulder $5°$ against which the end of the hub 4 fits.

The inner end of the enlarged portion of the sleeve 5 is provided with an annular flange 6 from which extend in diametrically opposite directions wing portions $6^x$ and $6°$ each of which is provided with bearing enlargements 7 and 8 from which the studs 9 and 10 extend.

11 are levers. A lever 11 is mounted on each stud 10 of the wing portions $6^x$ and $6°$. The opposite end of each lever 11 is provided with a weight 12 formed integral therewith and with an enlargement 13 formed intermediately of the length of each lever provided with a central slot 14 which is set in a substantially radial position, each lever 11 being curved in an arc substantially concentric to the centre of the pulley 1.

The inner end of each enlargement 13 is provided with an internally threaded orifice $13^x$ in which is screwed a set screw 15 bearing at its opposite end against the stud 9 which extends from the bearing enlargement 8 through the slot 14.

The set screw 15 is adjusted to give the correct clearance between the pulley face and shoe face so as to reduce chattering to a minimum and prevent the slapping of the shoes during the engagement of the clutch.

16 are the shoes of my clutch, such shoes being segmental in form and provided centrally with recesses 17. 18 are bearing blocks provided with lugs 19 extending into the recesses 17 and having central orifices 20 through which cross pins 21 extend, such cross pins extending through orifices 22 formed in the shoe 16 in alignment with the orifices 20 of the lugs 19. The blocks 18 are integral with the levers 11.

The blocks 18 are provided with socket recesses 23 for a purpose which will hereinafter appear.

24 is a collar slidable upon the sleeve 5 provided with flanges 25 and 26 forming an annular groove 27 for engagement with a suitable operating lever.

28 are bosses formed on the collar 24 at diametrically opposite sides thereof, for a purpose which will hereinafter appear.

29 are T shaped links, said T shaped links being set horizontally, the main arm of each link being pivotally mounted upon a pin 30 extending from each boss 28.

31 and 32 are forked members straddling the sleeve 5, the ends of the forks being pivotally mounted at each side of the sleeve 5 by pins 33 and 34 to the vertically disposed arms of the T links 29. The central portion of each forked member 31 and 32 is provided with an enlargement 35 provided with an internally threaded orifice 36.

37 is an arm provided with an externally threaded portion 38 which is screwed into the internally threaded orifice 36, one arm 37 extending from each forked member 31 and 32. The intermediate portion of each arm 37 is in the form of a nut $38^x$ from which extends a sleeve portion 39.

40 is a cylindrical member slidable within the sleeve portion 39 and provided with an inwardly extending stem 41 extending into an orifice 42 in the base of the sleeve portion 39. Between the base of the sleeve portion 39 and the cylindrical member 40 extends a spiral spring 43 surrounding the stem 41. The cylindrical portion 40 is provided with a ball end 44 fitting within the socket recess 23. The ball end 44 is retained in place by a retaining plate 45, which is suitably secured to the block 18 and is slotted as indicated at 46, to permit of the swinging movement of the ball end of the arm 37.

47 is a tension spring connected at one end to a block 18 and at the opposite end to the flange 6.

When operating my clutch all that it is necessary to do is to force the collar 24 inward, thereby carrying the forked members 31 and 32 inward, the arms 37 swinging upon the ball ends 44, the springs 43 during this movement gradually compressing so as to force the shoes 16 outward against the internal periphery of the flange 2 of the pulley 1.

The amount of pressure exerted by the shoes against the flange of the pulley, or the gripping effect produced, may be adjusted by turning the nut portions 38$^x$ of the arms 37 and screwing the inner ends 38 of such arms inward or outward of the orifices 36.

By this means the amount of slippage produced in a pulley may be readily controlled so as to vary the driving speed to a nicety.

When the clutch levers are operated to release the clutch centrifugal force on the weighted outer ends of the levers causes the segmental shoes to be instantly freed from contact with the pulley rim and are retained in a disengaged position by springs 47.

What I claim as my invention is:

1. The combination with a pulley provided with a central hub and rim of a central support adapted to be mounted on a shaft and projecting over said hub, wing members extending outward from said central support, segmental shoes adapted to frictionally engage the inner periphery of the pulley rim, a lever pivotally mounted intermediately of its length on each wing member and having a transverse slot, a stud extending from each wing member into a corresponding lever slot, a set screw extending through the inner end wall of each slot to adjust the clearance between the shoes and the inner face of the pulley rim and a pivotal connection between each lever and one of the aforesaid shoes.

2. The combination with a pulley provided with a central hub, of a bearing support extending axially from the hub, a collar slidable upon the support, segmental friction shoes adapted to engage the pulley at diametrically opposite points, levers pivotally connected at one end to the shoes and pivotally mounted intermediate of their length upon the aforesaid support and having weighted outer ends, compressible members pivotally connected to the shoes, and a connection between the opposite ends of such members and the collar adapted to automatically equalize the pressure on the compressible members and shoes exerted by the inward movement of the collar.

3. In a variable speed clutch of the class described, the combination with a pulley, a hub and a collar slidable thereon and the shoes coacting with the pulley, of forked members, pivotal connections between the forked members and the collar, an adjustable compressible member extending between each forked member and a corresponding shoe each compressible member being provided with a threaded inner end extending into a corresponding forked member, and a pivotal connection between the opposite end of each compressible member and the corresponding shoe.

WALTER ROBERT MARKWICK.